United States Patent
Park

(10) Patent No.: US 7,298,323 B2
(45) Date of Patent: Nov. 20, 2007

(54) APPARATUS AND METHOD FOR LOCATING USER EQUIPMENT USING GLOBAL POSITIONING SYSTEM AND DEAD RECKONING

(75) Inventor: Byung-Jun Park, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/337,454

(22) Filed: Jan. 7, 2003

(65) Prior Publication Data
US 2004/0027278 A1    Feb. 12, 2004

(30) Foreign Application Priority Data
Jan. 17, 2002  (KR) ................. 10-2002-0000758

(51) Int. Cl.
*G01S 5/14* (2006.01)
(52) U.S. Cl. ................... 342/357.14; 342/458
(58) Field of Classification Search ............. 342/357.1, 342/357.08, 387, 357.14, 458
See application file for complete search history.

(56) References Cited

U.S. PATENT DOCUMENTS

| | | | | |
|---|---|---|---|---|
| 2,911,143 A | * | 11/1959 | Wright | 235/61 R |
| 3,710,331 A | * | 1/1973 | Kiisk | 342/464 |
| 4,024,383 A | * | 5/1977 | Beasley | 701/207 |
| 4,229,620 A | * | 10/1980 | Schaible | 455/456.1 |
| 4,731,613 A | * | 3/1988 | Endo et al. | 342/357.14 |
| 5,058,023 A | * | 10/1991 | Kozikaro | 701/217 |
| 5,379,045 A | * | 1/1995 | Gilbert et al. | 342/357.03 |
| 5,563,611 A | * | 10/1996 | McGann et al. | 342/389 |
| 5,796,613 A | * | 8/1998 | Kato et al. | 701/214 |
| 6,246,363 B1 | * | 6/2001 | Yung et al. | 342/357.14 |
| 6,289,280 B1 | * | 9/2001 | Fernandez-Corbaton et al. | 701/214 |
| 6,408,244 B2 | * | 6/2002 | Ito | 701/213 |

FOREIGN PATENT DOCUMENTS

EP    957370 A1 * 11/1999

OTHER PUBLICATIONS

McLellan, James F. et al, "The NavTrax Fleet Management System," IEEE 1992, pp. 509-515.*

* cited by examiner

Primary Examiner—Gregory C. Issing
(74) Attorney, Agent, or Firm—The Farrell Law Firm

(57) ABSTRACT

An apparatus and method for locating a UE using a GPS and a dead-reckoning sensor are disclosed. At an initial time, the UE calculates its initial position and the initial position of a serving Node B using a received GPS satellite signal and calculates a first distance between the UE and the Node B based on a first RTT received from the Node B. A predetermined time later, the UE calculates a second distance between the UE and the Node B based on a second RTT received from the Node B, calculates the distance that it has moved using the first and second distances and its position angle measured the predetermined time later, and calculates a displacement in correspondence with the distance using the position angle. Then the position of the UE is obtained by adding the displacement to the initial position of the UE.

3 Claims, 3 Drawing Sheets

APPARATUS AND METHOD FOR LOCATING USER EQUIPMENT USING GLOBAL POSITIONING SYSTEM AND DEAD RECKONING

PRIORITY

This application claims priority to an application entitled "Apparatus and Method for Locating User Equipment Using Global Positioning System and Dead Reckoning" filed in the Korean Industrial Property Office on Jan. 7, 2002, and assigned Ser. No. 2002-758, the contents of which are hereby incorporated by reference.

BACKGROUND OF THE INVENTION

1. Field of the Invention

The present invention relates generally to a mobile communication system, and in particular, to an apparatus and method for accurately locating a UE (User Equipment) in the shadow area of GPS (Global Positioning System) satellite signals.

2. Description of the Related Art

With the ever-growing proliferation of personal, portable devices, one of the clear tendencies in modern society is to encourage and support provision of a positioning service for emergency services such as E911, (Emergency Call) service. Particularly, the United States seeks to deploy a nationwide, seamless communications infrastructure for the E911, service based on position information of UEs. It is provided by FCC (Federal Communication Committee) that the UE; positioning service should have an error of ±125M. With this relatively accurate UE positioning, it is possible to further provide other position information-related services.

The growing demands for the UE positioning service increases the importance of more accurate UE positioning. In general, a UE is located using Cell ID, AOA (Angle of Arrival), TOA (Time of Arrival), TDOA (Time Difference of Arrival), and at least three GPS (Global Positioning System) satellites.

In the Cell-ID method, a Node B, taking charge of cells and having information about its own accurate position, locates UEs within each cell based on its position. Since the positions of the UEs are determined on a cell by cell basis, they may be inaccurate. The AOA method is viable only when the angles between the Node B and the UEs are known through an intelligent antenna such as a smart antenna. The Node B can accurately locate the UEs based on the angles in transmitting data. Without the angles, therefore, it is impossible to accurately locate the UEs.

The TOA method locates a UE using the difference between a signal transmission time from the Node B and a signal arrival time at the UE. In the TDOA method, at least three Node Bs determine the position of a UE by triangulation of their transmitted signals to the UE. A distinctive shortcoming of the TDOA method is that it is impossible to accurately locate the UE in a radio channel environment having densely arranged obstacles like tall buildings, and thus many erroneous positioning factors like signal refraction and diffraction are present. The UE can also be located using GPS satellite signals. However, the GPS-based method is not feasible in an area where GPS satellite signals are not received such as a shadow area (e.g., subway).

Existing mobile communication systems can locate UEs in the above UE positioning methods either alone or in combination. It is noted that the GPS-based method is a more widespread used method because the use of GPS satellite signals provides an accurate absolute position of a UE. As described above, however, the GPS-based method cannot be carried out in the shadow areas.

SUMMARY OF THE INVENTION

It is, therefore, an object of the present invention to provide an apparatus and method for accurately locating a UE in an area where GPS satellite signals cannot be received. Positioning an object based on signals received from at least three DGPS satellites is a technique well known to persons skilled in the art and details of the technique will not be recited herein. For simplicity, the at least three DGPS satellites and signals therefrom will be recited in singularity (e.g., satellite, signal) in the following description.

It is another object of the present invention to provide an apparatus and method for accurately locating a UE based on the velocity of the moving UE using its position angle with respect to a reference dead-reckoning point in an area where GPS satellite signals cannot be received.

To achieve the above and other objects, there are provided an apparatus and method for locating a UE using a GPS and dead reckoning.

According to one aspect of the present invention, in the UE positioning apparatus, a Dead-Reckoning ("DR") sensor senses the position angle of a UE with respect to a reference DR point. A GPS processor receives a signal from a GPS satellite and calculates a code pseudorange and a carrier pseudorange rate between the UE and the GPS satellite using the received signal. A position detector calculates the initial positions of the UE and a serving Node B using the code pseudorange and the carrier pseudorange rate at an initial time, calculates a first distance between the UE and the Node B using information about a first Round Trip Time ("RTT") received from the Node B at the initial time, calculates a second distance between the UE and the Node B using information about a second RTT received from the Node B at a predetermined time after the initial time, calculates a distance that the UE has moved from the initial time to the predetermined time using the first and second distances and the position angle of the UE at the predetermined time, calculates a displacement using the distance and the position angle, and determines the position of the UE at the predetermined time by adding the displacement to the initial position of the UE.

According to another aspect of the present invention, in the UE positioning apparatus, a DR senses the position angle of the UE with respect to a reference DR point. A GPS processor receives a signal from a GPS satellite and calculates a code pseudorange and a carrier pseudorange rate between the UE and the GPS satellite using the received signal. A velocity sensor senses the velocity of the UE. A position detector calculates the initial positions of the UE and a serving Node B using the code pseudorange and the carrier pseudorange rate at an initial time, calculates a distance that the UE has moved from the initial time to a predetermined time after the initial time using a velocity of the UE measured at the predetermined time, calculates a displacement in correspondence with the distance using a position angle of the UE measured at the predetermined time, and determines the position of the UE at the predetermined time by adding the displacement to the initial position of the UE.

According a further aspect of the present invention, in the method of locating a UE, the initial positions of the UE and a serving Node B are calculated using a signal received from a GPS satellite at an initial time. A first distance between the UE and the Node B is calculated using information about a first RTT received from the Node B at the initial time, and a second distance between the UE and the Node B is calculated using information about a second RTT received from the Node B at a predetermined time after the initial time. The distance that the UE has moved from the initial time to the predetermined time is calculated using the first and second distances and a position angle of the UE measured at the predetermined time, a displacement in correspondence with the distance is calculated using the position angle, and the position of the UE at the predetermined time is determined by adding the displacement to the initial position of the UE.

According still another aspect of the present invention, in the method of locating a UE, the initial positions of the UE and a serving Node B are calculated at an initial time. The distance that the UE has moved from the initial time to a predetermined time after the initial time is calculated using a velocity of the UE measured at the predetermined time. A displacement in correspondence with the distance is calculated using a position angle of the UE measured at the predetermined time. Then the position of the UE at the predetermined time is determined by adding the displacement to the initial position of the UE.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

To accurately determine the position of a UE, the initial position, position angle, and velocity of the UE, and the distance between the UE and a serving Node B are required. The UE's initial position is calculated using received DGPS (Differential Global Positioning System) information. The initial position is relatively accurate because its error is in a maximum range of ±10 m.

The DGPS is a more accurate positioning system than the GPS. Under DGPS operation, a Node B connected to the DGPS calculates the position of a UE currently served by the Node B by correcting a pseudorange measurement of the UE by a pseudorange correction value generated in the Node B, taking into account clock errors and atmospheric errors. The Node B first receives the mobile pseudorange measurement from the UE and generates a UE's corrected pseudorange using the pseudorange correction from the Node B The Node B then accurately locates the UE based on the corrected pseudorange and the distance to the UE. The Node B transmits information of the position of the UE to the UE. Thus the UE determines its initial position from the DGPS information.

In the following description, it is to be understood that all references to GPS refer to DGPS information.

The distance between the Node B and the UE is calculated based on an RTT (Round Trip Time) of the pilot signal and the UE is not equipped with a speedometer. Thus, the distance between the Node B and the UE is calculated based on an initial RTT received from the Node B, and then based on an RTT received from the Node B a predetermined time later, for example, one second later. Then the position of the UE is calculated using the difference between the distances. In this case, it is assumed that GPS satellite signals are received initially and not received the predetermined time (one second) later.

Figure 1:
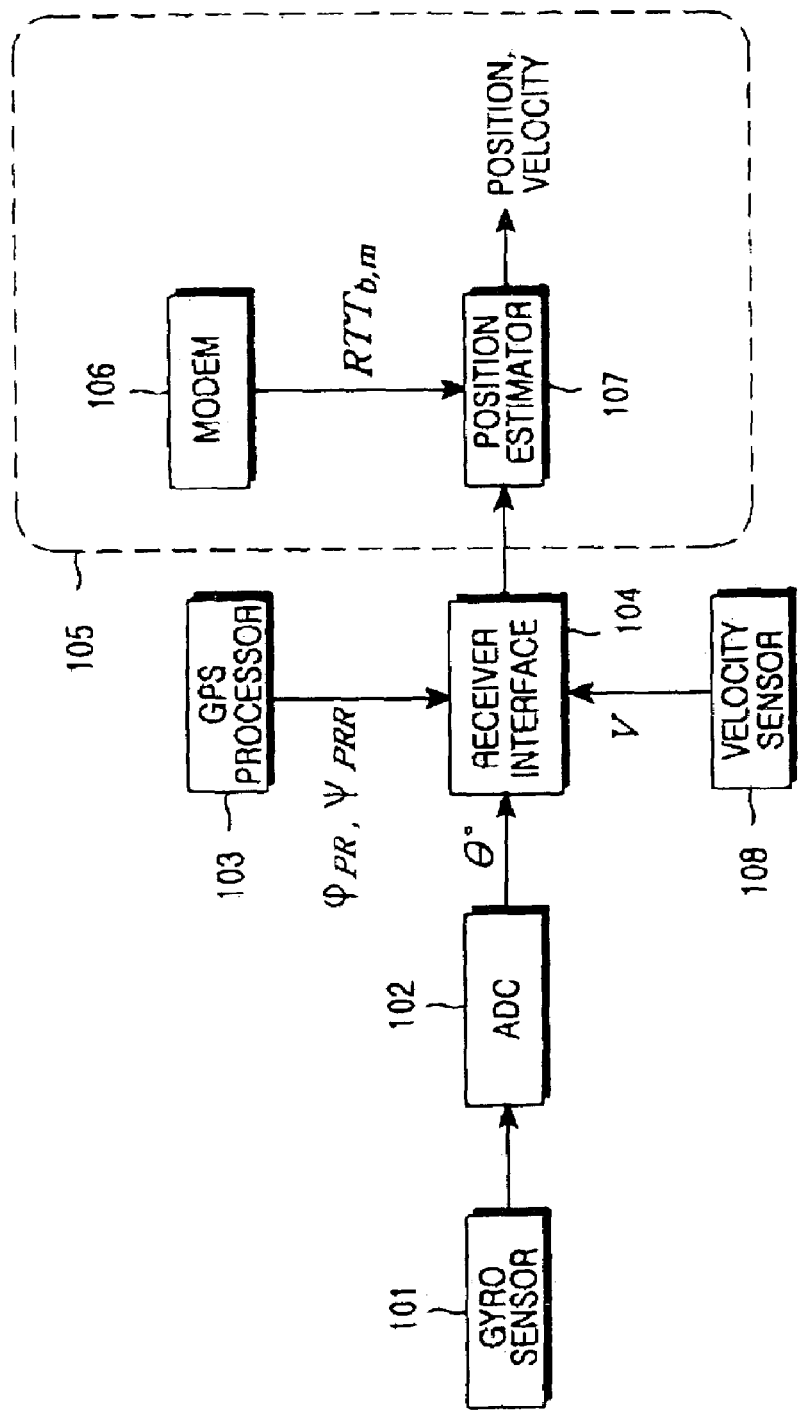
FIG. 1 is a block diagram of an apparatus for locating a UE using a GPS signal and a dead-reckoning sensor according to an embodiment of the present invention.

FIG. 1 is a block diagram of an apparatus for locating a UE using the GPS and a dead-reckoning sensor according to an embodiment of the present invention.

Referring to FIG. 1, a gyro sensor 101 is a type of dead-reckoning (DR) sensor. The DR sensor senses the angular movement of an object (e.g., a UE) based on its angular momentum in at least one DR plane perpendicular to a spin axis and senses the position angle of the object with respect to a reference DR point, i.e. North in the embodiment of the present invention. The gyro sensor 101 is attached at an appropriate position of the UE and has anti-vibration and high SNR (signal to noise ratio) characteristics.

In operation, the gyro sensor 101 senses the position angle $\theta$ of the UE with respect to the reference DR point. An analog-to-digital converter (ADC) 102 digitizes the position angle $\theta$ to $\theta'$. To match to the characteristics of the gyro sensor 101, the ADC 102 must be designed to generate bits of which the number is within a maximum resolution range of the gyro sensor 101.

A GPS processor 103 measures the code pseudorange $\phi_{PR}$, and carrier pseudorange rate $\psi'_{PRR}$, between the UE and a GPS satellite using a signal received from the GPS satellite. The code pseudorange $\phi_{PR}$, can be calculated based on a code range used in the GPS satellite and the carrier pseudorange rate $\psi'_{PRR}$, can be calculated based on a carrier Doppler shift used in the GPS satellite.

A velocity sensor 108, if the UE is in a moving object like a vehicle, senses the velocity of the moving object. The velocity sensor 108 will be described in more detail with reference to FIG. 2.

Figure 2:
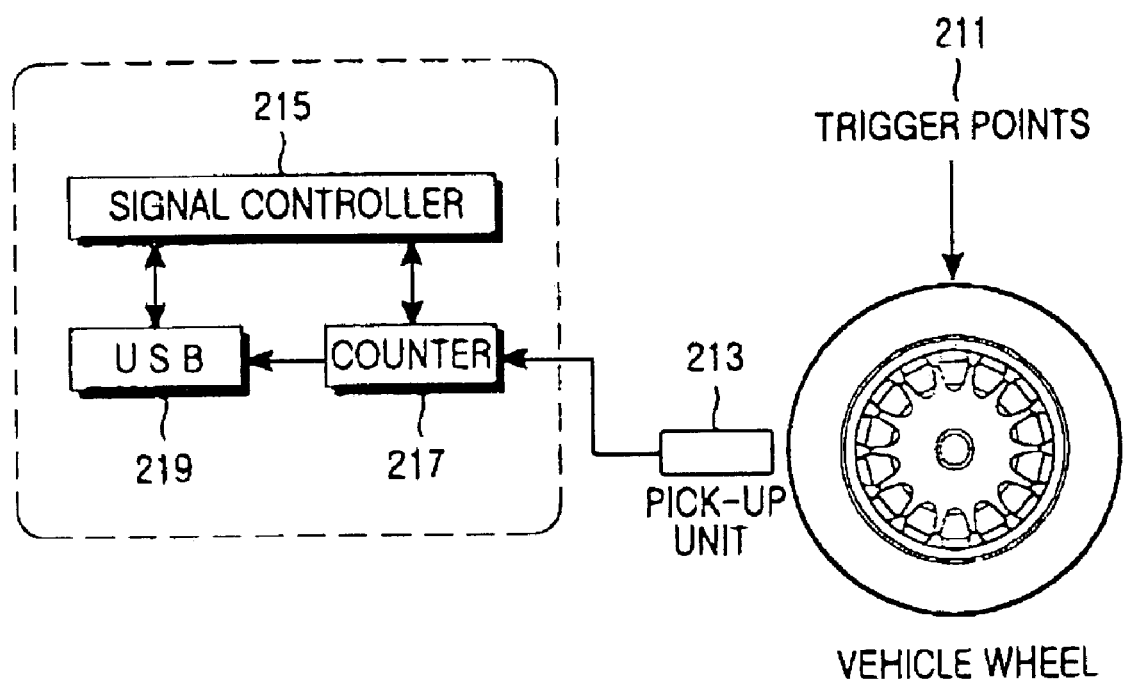
FIG. 2 is a schematic view illustrating the interior structure of a velocity sensor illustrated in FIG. 1.

FIG. 2 is a block diagram of the velocity sensor 108. Referring to FIG. 2, a plurality of trigger points 211 are disposed in appropriate positions of the moving object, for example, using the wheels of the vehicle. A pick-up unit 213 senses the trigger points 211 and outputs sensing signals to a signal controller 215. The pick-up unit 213 can sense the trigger points 211, for example, by magnetic field signals. The signal controller 215 feeds the sensing signals to a counter 217. The counter 217 counts the sensing signals and feeds the count to the signal controller 215. The signal controller 215 transmits the count via a USB (Universal Serial Bus) 219 to a position detector 105 through a receiver interface 104 (FIG. 1). The velocity of the vehicle is calculated using the circumference of the wheels and the count of the trigger points 211. That is, if the wheel circumference is measured and the number of the trigger points 211 on the wheel is counted, the vehicle velocity is calculated.

The receiver interface 104 interfaces to a position estimator 107 of position detector 105 the position angle $\theta'$ received from the ADC 102, the code pseudorange $\theta_{PR}$, and the carrier pseudorange rate $\psi'_{PRR}$, received from the GPS processor 103, and the velocity received from the velocity sensor 108.

The position detector 105 is comprised of a MODEM 106 and the position estimator 107. The MODEM 106 receives information about the RTT $RTT_{b,m}$ between the Node B and the UE and feeds it to the position estimator 107. The RTT is a function of time. The position estimator 107 estimates the position of the UE based on the $RTT_{b,m}$, the position angle $\theta'$, the code pseudorange $\theta_{PR}$, the carrier pseudorange rate $\psi'_{PRR}$, and the vehicle velocity.

The position estimator 107 relies on the RTT or velocity in estimating the UE's position. The RTT-based position estimation will be described below.

The position estimator 107 calculates the initial position of the UE based on the code pseudorange $\theta_{PR}$, and the carrier pseudorange rate $\psi'_{PRR}$. The serving Node B notifies the UE of its accurate position in the form of predetermined information. Then the distance (hereinafter, referred to as a first distance) between the Node B and the UE is calculated using an initial RTT (hereinafter, referred to as a first RTT) received from the MODEM 106. A predetermined time later, for example, one second later, the distance between the Node B and the UE is calculated using an RTT (hereinafter, referred to as a second RTT) received from the MODEM 106. The distance that the UE has covered for the predetermined time after the initial time is calculated based on the position angle $\theta'$ of the UE sensed the predetermined time later and the first and second distances.

Now velocity-based position estimation will be described below.

As stated above, the position estimator 107 calculates the initial position of the UE based on the code pseudorange $\theta_{PR}$, and the carrier pseudorange rate $\psi'_{PRR}$. The serving Node B notifies the UE of its accurate position in the form of predetermined information. Then the distance that the UE has covered for a predetermined time after an initial time is calculated based on a predetermined time later-sensed velocity of the UE. The actual position displacement of the UE is calculated using the distance and a predetermined time later-sensed position angle of the UE. Then the position of the UE is calculated by adding the position displacement to the initial position.

The position estimator 107 is realized as a Kalman filter, or estimates the UE's position using a Least Square method. The Kalman filter, when noise is involved in a system status parameter, provides optimal linear estimation of the status parameter such that an average squared error is minimized using a noise measurement.

Figure 3A:
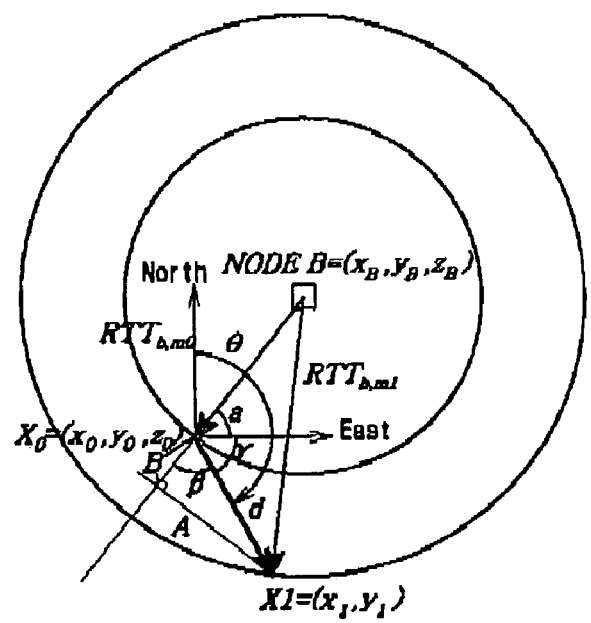
FIGS. 3A and 3B are schematic views illustrating a method of estimating the position of the UE according to the embodiment of the present invention.
Figure 3B:
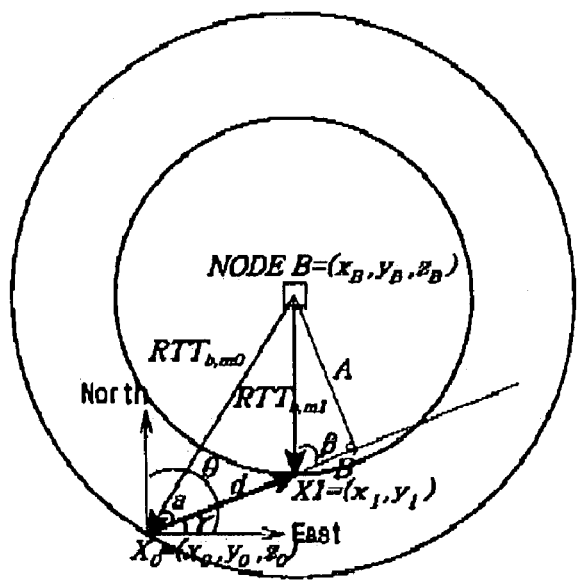

FIGS. 3A and 3B schematically illustrate a method of estimating the position of a UE according to the embodiment of the present invention. FIG. 3A illustrates estimation of the position of a UE when it moves away from a Node B and FIG. 3B illustrates estimation of the position of the UE when it approaches the Node B.

Referring to FIG. 3A, the initial position of the UE is set as the original point of a three-dimensional (x, y, z) coordinate system and thus expressed as $(x_0, y_0, z_0)$. The initial position of the Node B is expressed as $(x_B, y_B, z_B)$. As described before, it is assumed that the UE's accurate initial position has already been known from GPS satellite signals. The position estimator 107 detects angles $\alpha$, $\beta$, and $\gamma$ related with a current UE's position $X_1$, using the position angle $\theta'$ of the UE. This is possible because the position angle $\theta'$ is an angle by which the UE rotates with respect to a reference DR point, for example, North. Since the initial positions of the Node B and the UE are known, the position estimator 107 can calculate the distance D between the Node B and the UE at an initial time by $$D = \lambda \times (RTT_{b,m0}/2) \quad (1)$$

where $\lambda$ is the wavelength of a frequency and $RTT_{b,m0}$, is the RTT between the UE and the Node B at the initial time.

Using $RTT_{b,m0}$, $RTT_{b,m1}$, and $(\alpha, \beta, \gamma)$, the distance d the UE has moved from the initial time to a current time is calculated. Here, $RTT_{b,m1}$, is the RTT between the Node B and the UE at the current time, received from the MODEM 106. From this point, the position of the UE is considered not in three-dimensional coordinates but in two-dimensional coordinates. That is, the initial position $X_0$, and current position $X_1$, of the UE are represented as $(x_0, y_0)$ and $(x_1, y_1)$, respectively.

The current position $X_1$, of the UE is expressed as $$\hat{X}_1 = \vec{X}_0 + \vec{d} \quad (2)$$

where $\vec{X}_0$, is the initial position of the UE $(x_0, y_0)$ and $\vec{d}$ is the distance between the initial position and the current position of the UE. Assuming the UE is moving in a northeasterly direction, the distance is calculated using its eastward and northward distance components as follows.

$$\vec{d} : d_E = d \cdot \sin(\theta'')$$

$$d_N = d \cdot \cos(\theta'') \quad (3)$$

where d is the distance that the UE has moved from the initial time to the current time, $d_E$, is an eastward displacement from the initial position of the UE, and $d_N$, is a northward displacement from the initial position. The current position of the UE is obtained by adding the eastward and northward displacements to the initial position.

When the UE approaches the Node B as illustrated in FIG. 3B, its position can be calculated in the same manner as illustrated in FIG. 3A.

Parameters used to obtain the current position of the UE in the manner illustrated in FIG. 3A are expressed as $$A = RTT_{b,m0} \sin(\beta)$$

$$B = RTT_{b,m1} \sin(\beta)$$

$$\sin(\gamma) = \frac{A}{RTT_{b,m1}} = \frac{RTT_{b,m0}}{RTT_{b,m1}} \sin(\beta)$$

$$\gamma = \sin^{-1}\left(\frac{RTT_{b,m0}}{RTT_{b,m1}} \sin(\beta)\right)$$

$$d = RTT_{b,m1} \cos(\gamma) - B = RTT_{b,m1} \cos(\gamma) - RTT_{b,m0} \cos(\beta)$$

Parameters used to obtain the current position of the UE in the manner illustrated in FIG. 3B are expressed as $$A = RTT_{b,m0} \sin(\alpha)$$

$$B = RTT_{b,m1} \cos(\beta)$$

$$\sin(\beta) = \frac{A}{RTT_{b,m1}} = \frac{RTT_{b,m0}}{RTT_{b,m1}} \sin(\alpha)$$

$$\beta = \sin^{-1}\left(\frac{RTT_{b,m0}}{RTT_{b,m1}} \sin(\alpha)\right)$$

$$d = RTT_{b,m0} \cos(\alpha) - B = RTT_{b,m0} \cos(\alpha) - RTT_{b,m1} \cos(\beta)$$

With reference to FIGS. 3A and 3B, a description will be made of a method of estimating the position of the UE using its velocity when the UE is inside a moving object, for example, a vehicle.

The position estimator 107 calculates the current position of the UE, $X_1(=(x_1, y_1))$ based on a velocity V provided by the receiver interface 104 and the initial position of the UE, $X_0(=(x_0, y_0))$. The velocity V is the rate of distance traveled to time elapsed. The distance is calculated by integrating the velocity V over the time. If the UE moves at the velocity V from the initial position to the current position, the distance can be calculated. The current position $X_1$, of the UE is determined using the velocity V by $$\hat{X}_1 = \vec{X}_0 + \int_0^1 V dt \quad (4)$$

where the time between t0, and t1, corresponds to the time between the initial time and the current time and $\int_0 V dt$ is the distance that the UE has moved. Let the distance be v. Then the displacement of the UE is known from the initial position using the distance v.

$$V: V_E = v \cdot \sin(\theta'')$$

$$V_N = v \cdot \cos(\theta'') \quad (5)$$

where $V_E$, and $V_N$, are eastward and northward displacements from the initial position, respectively. Therefore, the current position of the UE is obtained by adding the eastward and northward displacements $V_E$, and $V_N$, to the initial position.

As described above, the present invention advantageously enables calculation of the accurate position of a UE using its position angle and the velocity of a moving object with the UE in an area where GPS satellite signals are not received in a mobile communication system. Therefore, upon request for a positioning service, an immediate response can be made for the request. Continuous UE positioning in the non-GPS signal receiving area provides reliability to a UE position-based service such as a home-zone service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for locating a UE (User Equipment) using a DGPS (Differential Global Positioning System) receiver and a dead-reckoning sensor, comprising:
   the dead-reckoning (DR) sensor for sensing position angles of the UE at different times with respect to a predetermined reference DR point; and
   a position detector, comprising:
   a MODEM for receiving from a Node B serving the UE first information about a first round trip time (RTT) at an initial time and second information about a second RTT at a predetermined time when the UE is in a shadow area of DGPS satellites, the predetermined time following the initial time; and
   a position estimator for:
   (a) calculating a first distance between the UE and the Node B, using the first information, the first distance corresponding to the UE at the initial time,
   (b) determining a first position of the UE at the initial time and a fixed position of the Node B, the first position and the fixed position calculated by the Node B using signals from at least three DGPS satellites,
   (c) calculating a second distance between the UE and the Node B, using the second information, the second distance corresponding to the UE at the predetermined time,
   (d) calculating a moved distance that the UE has moved from the initial time to the predetermined time, using the first distance, the second distance and a position angle of the UE at the predetermined time,
   (e) calculating a moved vector, using the moved distance and the position angle of the UE at the predetermined time, and
   (f) estimating a second position of the UE at the predetermined time by using the first position and the moved vector.

2. The apparatus of claim 1, wherein the DR sensor is a gyro sensor.

3. A method of locating a UE (User Equipment) using DGPS (Differential Global Positioning System), comprising:
   compiling by the UE a first position of the UE at an initial time and a fixed position of Node B serving the UE, the first position and the fixed position calculated by the Node B using signals from at least three DGPS satellites;
   calculating a first distance between the UE and the Node B, using information about a first RTT (Round Trip Time) received from the Node B at the initial time, the first distance corresponding to the UE at the initial time;
   calculating a second distance between the Node B and the UE at a predetermined time when the UE is in a shadow area of DGPS satellites, the predetermined time following the initial time, using information about a second RTT received from the Node B at the predetermined time;
   calculating a moved distance that the UE has moved from the initial time to the predetermined time, using the first distance, the second distance and a position angle of the UE at the predetermined time;
   calculating a moved vector using the moved distance and the position angle of the UE at the predetermined time; and estimating a second position of the UE at the predetermined time by using the first position and the moved vector.

* * * * *